(12) United States Patent
Finni

(10) Patent No.: US 7,493,377 B2
(45) Date of Patent: Feb. 17, 2009

(54) METHOD AND APPARATUS TO MANAGE A CONFIGURATION OF CLUSTERED COMPUTERS ACCORDING TO DEPLOYMENT DATE STRUCTURES

(75) Inventor: Olli Finni, Helsinki (FI)

(73) Assignee: Nokia Corporation, Espoo (FI)

( * ) Notice: Subject to any disclaimer, the term of this patent is extended or adjusted under 35 U.S.C. 154(b) by 968 days.

(21) Appl. No.: 10/638,480

(22) Filed: Aug. 12, 2003

(65) Prior Publication Data

US 2004/0255010 A1 Dec. 16, 2004

(30) Foreign Application Priority Data

Jun. 10, 2003 (FI) .................................. 20030866

(51) Int. Cl.
*G06F 15/16* (2006.01)
*G06F 15/173* (2006.01)
*G06F 15/177* (2006.01)

(52) U.S. Cl. ...................... 709/220; 709/222; 713/165; 370/466

(58) Field of Classification Search .......... 709/217–228; 370/466; 713/165
See application file for complete search history.

(56) References Cited

U.S. PATENT DOCUMENTS

| | | | |
|---|---|---|---|
| 6,466,972 B1 * | 10/2002 | Paul et al. .................... | 709/222 |
| 6,725,261 B1 * | 4/2004 | Novaes et al. ............... | 709/220 |
| 6,772,337 B1 * | 8/2004 | Yener .......................... | 713/165 |
| 7,206,827 B2 * | 4/2007 | Viswanath et al. .......... | 709/220 |
| 2002/0093980 A1 * | 7/2002 | Trebes, Jr. ................... | 370/466 |
| 2003/0037234 A1 * | 2/2003 | Fu et al. ...................... | 713/158 |
| 2003/0046269 A1 * | 3/2003 | Yamazaki ...................... | 707/1 |
| 2003/0225667 A1 | 12/2003 | Wedlake | |
| 2003/0225867 A1 * | 12/2003 | Wedlake ..................... | 709/222 |
| 2006/0047790 A1 * | 3/2006 | Nguyen ....................... | 709/220 |

OTHER PUBLICATIONS

"Design Patterns: Elements of Reusable Object-Oriented Software," E. Gamma, R. Helm, R. Johnson and J. Vlissides; Addison-Wesley 1995, ISBN 0201633612, Ch. 3, pp. 117-126.
Juha Korhonen, "Introduction to 3G Mobile Communications," May 31, 2001, ISBN: 1-58053 287-X, pp. IV-XVIII, 1-335, 365-559, Artech House Books.
E. Gamma, et al., "Design Patterns: Elements of Reusable Object-Oriented Software," Oct. 31, 1994, Copyright: 1995, ISBN: 0201633612, Chapter 3, pp. 117-126, Addison-Wesley Longman, Inc.

* cited by examiner

*Primary Examiner*—Haresh N Patel
(74) *Attorney, Agent, or Firm*—Squire, Sanders & Dempsey, LLP

(57) ABSTRACT

A method, a controller, an arrangement and a computer program for managing a configuration of clustered computers is presented. The controller is configured to define configuration information as deployment prototypes for functional entities of clustered computers, to identify the predefined deployment prototypes needed for a configuration of clustered computers, to clone the identified deployment prototypes for creating deployment data structures for clustered computers, and to manage the configuration of clustered computers according to the created deployment data structures.

32 Claims, 3 Drawing Sheets

METHOD AND APPARATUS TO MANAGE A CONFIGURATION OF CLUSTERED COMPUTERS ACCORDING TO DEPLOYMENT DATE STRUCTURES

BACKGROUND OF THE INVENTION

1. Field of the Invention

The invention relates to a method for managing a configuration of clustered computers, a controller for managing a configuration of clustered computers, an arrangement for managing a configuration of clustered computers, and a computer program distribution medium readable by a computer and encoding a computer program of instructions for executing a computer process for managing a configuration of clustered computers.

2. Description of the Related Art

Clustered computers are used in many applications, such as in computer networks, telecommunications systems and radio telecommunications systems.

Configuration management of clustered computers is a laborious task. The configuration management of clustered computers includes the software configuration management of clustered computers. The configuration information related to the process of software configuration management and role assignment in a running computer is called deployment data of the computer. The deployment data includes deployment data structures. Configuration management can be performed with the use of deployment data structures. Deployment data structures define the configuration of functional entities, such as nodes and/or processes, which are present in clustered computers.

Traditionally large systems have supported the management of the deployment data. Typically there is some support in the user interface and the software itself to enable the creation of predefined deployment data structures, based on concepts of node types or functional unit types, for example. However the rules concerning the valid deployment structures are more or less hardwired with the software code. This approach makes the system inflexible. Whenever there is a need to change predefined deployment structures, to introduce a new node type or functional unit type, for example, the related software code has to be changed as well.

The amount of deployment data increases with the size of the computer and the number of computers. It is very laborious for the operator to create and maintain deployment data manually if there are dozens or even hundreds of nodes in one computer. The number of managed objects is in the order of magnitude higher than the number of nodes: there are hundreds or thousands of objects in the deployment. Thus one problem is how to make the management of the deployment data easier for the operator.

SUMMARY OF THE INVENTION

The invention provides an improved method, controller, arrangement and computer program for managing a configuration of clustered computers.

According to an embodiment of the invention, there is provided a method for managing a configuration of clustered computers. The method includes: defining configuration information as deployment prototypes for functional entities of clustered computers; identifying the predefined deployment prototypes needed for a configuration of clustered computers; cloning the identified deployment prototypes for creating deployment data structures for clustered computers; and managing the configuration of clustered computers according to the created deployment data structures.

According to another embodiment of the invention, there is provided a controller for managing a configuration of clustered computers. The controller is configured to define configuration information as deployment prototypes for functional entities of clustered computers, to identify the predefined deployment prototypes needed for a configuration of clustered computers, to clone the identified deployment prototypes for creating deployment data structures for clustered computers, and to manage the configuration of clustered computers according to the created deployment data structures.

According to another embodiment of the invention, there is provided an arrangement for managing a configuration of clustered computers. The arrangement includes: means for defining configuration information as deployment prototypes for functional entities of clustered computers; means for identifying the predefined deployment prototypes needed for a configuration of clustered computers; means for cloning the identified deployment prototypes for creating deployment data structures for clustered computers; and means for managing the configuration of clustered computers according to the created deployment data structures.

According to another embodiment of the invention, there is provided a computer program distribution medium readable by a computer and encoding a computer program of instructions for executing a computer process for managing a configuration of clustered computers. The process includes: defining configuration information as deployment prototypes for functional entities of clustered computers; identifying the predefined deployment prototypes needed for a configuration of clustered computers; cloning the identified deployment prototypes for creating deployment data structures for clustered computers; and managing the configuration of clustered computers according to the created deployment data structures.

The invention provides several advantages. When the invention is applied, there is no need to hardwire any deployment rules with the software. The creation of deployment data structures is less laborious than with the prior art techniques.

BRIEF DESCRIPTION OF THE DRAWINGS

Embodiments of the invention will be described below with reference to the accompanying drawings, in which.

DETAILED DESCRIPTION OF THE PREFERRED EMBODIMENTS

The described embodiments are applicable to clustered computers. A computer refers to a digital electronic device including a working memory, a central processing unit and a system clock. A number of peripheral devices may or may not be connected to computers. Clustered computers are nowadays used in many applications, including computer networks, telecommunications systems and radio telecommunications systems. Clustering refers to the fact that individual computers are communicating with each other and/or performing individual parts of a complete data processing task given to the clustered computers. The communication between clustered computers can be implemented with any communication technique suitable for the purpose, such as LAN (Local Area Network), Ethernet, Internet, or some other wired communication technique, or some suitable wireless communication technique.

One example of a clustered computer application is a modern mobile telecommunications system. Such a system can be GSM (Global System for Mobile Communications), GPRS (General Packet Radio System), or UMTS (Universal Mobile Telecommunications System), for example. Clustered computers in a mobile telecommunications system may communicate with each other through private networks or through virtual private networks, for example. Nokia® manufactures such mobile telecommunications system networks that include clustered computers, or network elements, communicating with each other by using the Internet Protocol (IP), for example. Such clustered computers may form part of the core network, or part of the radio access network, or even the whole core network or the whole radio access network, for example.

Nokia® has a product platform called Nokia® FlexiPlatform™ with which the embodiments can be realized. This platform utilizes the open, standard interface specifications of the Service Availability™ (SA) Forum. One such specification is the Application Interface Specification (AIS).

Further information on the radio system can, if necessary, be obtained in trade literature, for instance in Juha Korhonen: Introduction to 3G Mobile Communications, Artech House 2001, ISBN 1-58053-287-X. The embodiments are, however, not restricted to mentioned example systems, but one skilled in the art can also apply the instructions to other systems containing clustered computers.

Figure 1:
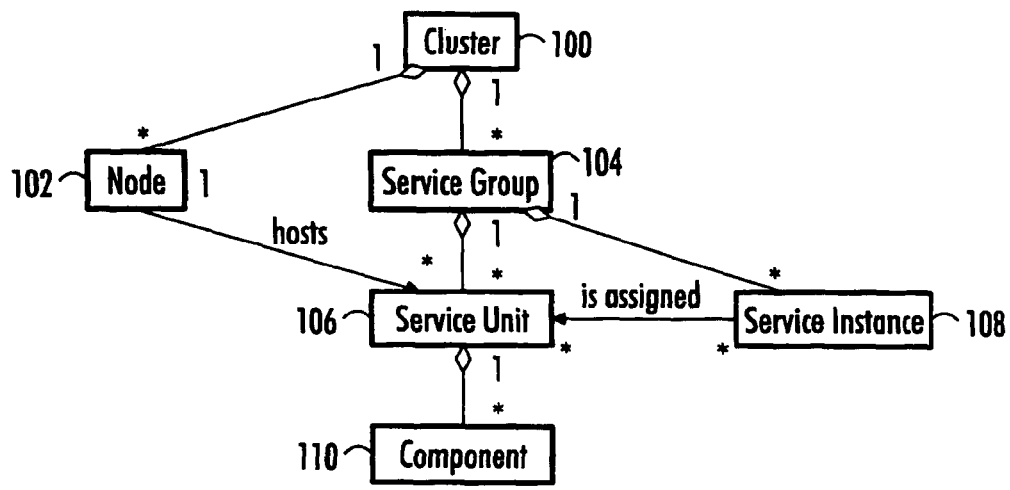
FIG. 1 shows a deployment data structure according to an embodiment of the invention.

FIG. 1 presents one potential deployment data structure of a computer belonging to clustered computers. A cluster 100 is a logical collection of a number of nodes 102 and service groups 104. A service group 104 is a logical entity used to group together a number of service units 106 which protect each other from failures in order to provide one or several service instances 108. A service unit 106 is a logical entity that encapsulates components 110 representing either hardware (any other than nodes) or software resources (for instance processes) into a single management unit. The service unit 106 is the basic unit of redundancy.

Figure 2:
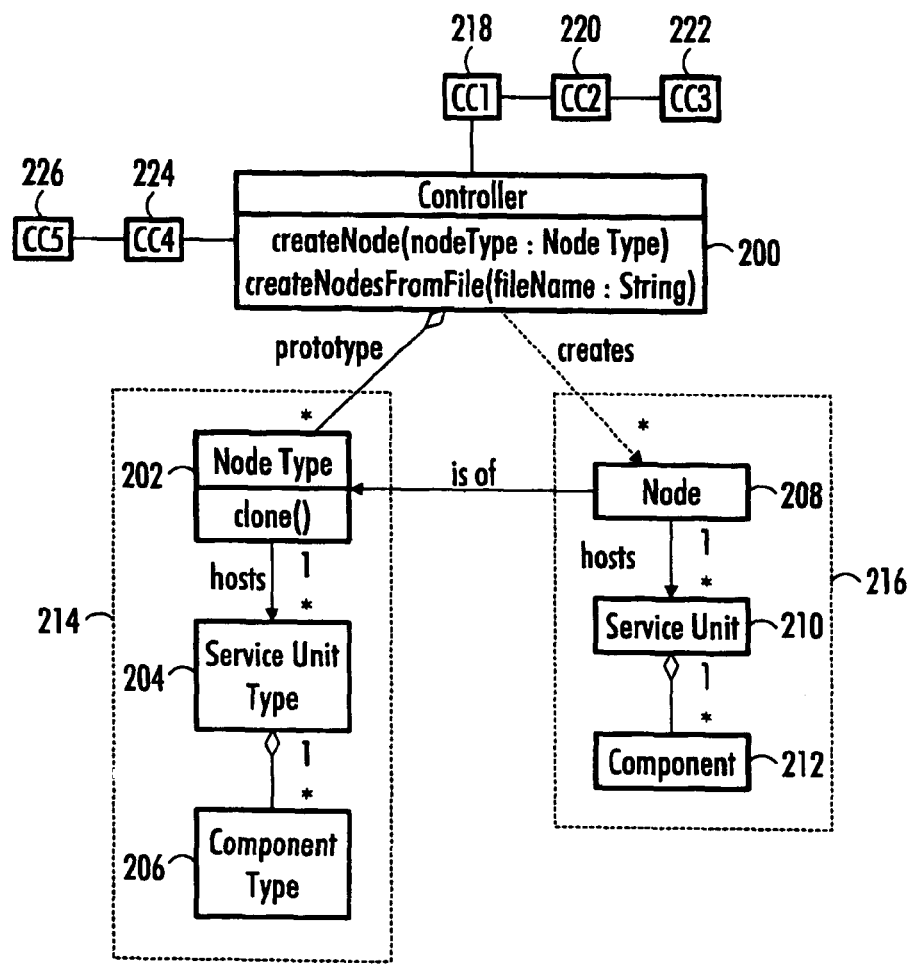
FIG. 2 illustrates a controller, clustered computers, a deployment prototype, and a deployment data structure according to an embodiment of the invention.

FIG. 2 illustrates a controller 200, clustered computers 218, 220, 222, 224, 226, a deployment prototype 214 and a deployment data structure 216. The controller 200 is used for managing a configuration of clustered computers 218, 220, 222, 224, 226. The controller 200 may itself be a computer. The controller 200 can also form a part in one computer of the clustered computers. As described in FIG. 2, the controller 200 can be realized in a centralized manner, i.e. as one network element. The controller 200 can, however, also be realized in a distributed manner, i.e. the functionalities of the controller 200 can be distributed between a separate controller network element and at least one clustered computer, or between clustered computers. Normally, in a computer implementation, the structure and the functionality of the controller 200 are implemented with at least one processor and software. Other implementation possibilities include one or more application-specific integrated circuits (ASIC) placed on a circuit board. The controller 200 may also include other hardware parts, such as other integrated circuits, for example clock circuits and communication interfaces. The building blocks of the controller 200 thus include hardware components, ASIC blocks, and software modules. In selecting the implementation mix, one skilled in the art will take into consideration for instance the requirements based upon the size and power consumption of the controller 200, the required processing power, manufacturing costs and production volumes.

In its simplest form, the controller 200 is a software application responsible for creating the needed deployment data structures 216 according to the deployment prototypes 214. The controller software encodes a computer program of instructions for executing a computer process for managing a configuration of clustered computers. The controller can be embodied on a computer program distribution medium readable by a computer. The distribution medium can be any known medium used for software distribution, such as a computer readable memory, a computer readable software distribution package, a computer readable signal, a computer readable telecommunications signal, or a computer readable compressed software package, for example.

In radio systems, the controller 200 can be run in one of the network elements or in the network management system of the radio system, for example. The controller 200 can be started either manually or by the operating system start-up script, for example.

The controller 200 is configured to define configuration information as deployment prototypes 214 for functional entities of clustered computers 218, 220, 222, 224, 226. As illustrated in FIG. 2, one controller 200 can control more than one configuration of clustered computers. In the first configuration of our example, there are three clustered computers 218, 220, 222, and in the second configuration, there are two clustered computers 224, 226. It is clear that in this context, as well as in the entire description, that it is only possible to show very simple examples. However, in reality, the number of clustered computers 218, 220, 222, 224, 226 can be much higher, and also deployment prototypes 214 and deployment data structures 216 can be much more complex.

Functional entities include a node, a service group, a service unit, a service instance, a component, a software resource, a hardware resource, a management unit, and a process. This list is not necessarily exhaustive, as the functional entity of the clustered computer refers to any configuration item present in clustered computers which can be configured by the controller 200.

When forming the deployment prototypes 214, a creational design pattern known as prototype is applied. The prototype design pattern is described in Gamma E., Helm R., Johnson R. and Vlissides J.: Design Patterns: Elements of Reusable Object-Oriented Software, Addison-Wesley 1995, ISBN 0201633612, Chapter 3, pages 117-126, which is incorporated herein by reference. The intent of the prototype design pattern is to specify the kinds of objects to be created by using a prototypical instance and to create new objects by copying this prototype. When utilizing the prototype technique, objects are cloned. First, a prototypical object is created, and then this prototypical object copies itself (=the object is cloned) in order to create a new object. This can be implemented in such a way that for the prototype a clone method is defined, and the controller 200 requests an execution of the clone method of the prototype, a copy being created in this way.

As mentioned earlier, the controller 200 is configured to define configuration information as deployment prototypes 214 for functional entities of clustered computers 218, 220, 222, 224, 226. This is done either in such a way that the operator of the controller 200 manually or semi-automatically may create the deployment prototypes 214, these deployment prototypes 214 may already exist in the controller 200, or these deployment prototypes 214 may be downloaded via a communication interface or a memory device into the memory of the controller 200. Normally, the manufacturer of clustered computers 218, 220, 224, 226 produces the deployment prototypes 214. The operator of the controller 200 may create totally new deployment prototypes 214, or, in a normal case, modify an existing deployment prototype 214 or take downloaded deployment prototypes 214 into use.

A need to manage the configuration of clustered computers 218, 220, 222, 224, 226 is an ongoing process. In an embodiment the controller 200 is configured to commission clustered computers 218, 220, 222, 224, 226. In such a commissioning process the operator allocates the initial role to the plain hardware and software of clustered computers. In an embodiment the controller is configured to increase the capacity of clustered computers 218, 220, 222, 224, 226. In such a capacity-wise scaling up process the operator adds some new hardware and/or software components in at least one clustered computer in order to increase the capacity. In an embodiment the controller 200 is configured to increase the functionality of clustered computers 218, 220, 222, 224, 226. In such a functionality-wise scaling up process the operator installs some new hardware and/or software in at least one clustered computer, which enables or implements the required functionality. In an embodiment the controller 200 is configured to reconfigure an existing configuration of clustered computers 218, 220, 222, 224, 226; thus installation of new hardware and/or software is not always needed when configuring the clustered computers 218, 220, 222, 224, 226. As a result of all cases above, the software configuration of the clustered computer is changed in a way that makes the plain hardware perform the desired role.

In order to perform the configuration management, the controller 200 is configured to identify the predefined deployment prototypes 214 needed for a configuration of clustered computers 218, 220, 222, 224, 226, to clone the identified deployment prototypes 214 for creating deployment data structures 216 for clustered computers 218, 220, 222, 224, 226, and to manage the configuration of clustered computers 218, 220, 222, 224, 226 according to the created deployment data structures 216.

The controller 200 typically contains more than one deployment prototype 214, although in the example of FIG. 2 only one is shown. The deployment prototype 214 in our example includes a node type object 202 which hosts a service unit type object 204, which in turn includes a component type object 206. As mentioned earlier, deployment prototypes 214 are typically created at the commissioning phase and they may be delivered to the system for example as a part of the software package. The controller 200 implements methods to create deployment data structures 216, for example nodes. In FIG. 2, when the operator wants to "create a new node", i.e. to assign a role to the related node hardware component, the operator generates a create command with the proper node type name through the user interface of the controller 200. The user interface, in turn, calls the createNode-method of the controller 200 with the user given node type. The createNode-method now creates the deployment data structure 216 by cloning the corresponding deployment prototype 214. The created objects in the deployment data structure 216 may be linked with counterpart objects in the deployment prototype 214: in this example the node object 208 is associated with the node type object 202. The deployment data structure 216 thus includes a node object 208, a service unit object 210 and a component object 212. In FIGS. 1 and 2, the relationships between the blocks are denoted with symbols 1 and *; 1 to * meaning one-to-many relationship, and * to * meaning many-to-many relationship.

In an embodiment, the controller 200 is configured to store and access deployment prototypes 214 and/or deployment data structures 216 according to the Lightweight Directory Access Protocol (LDAP). The LDAP standard defines a network protocol for accessing information in a directory, an information model defining the form and character of the information, and a namespace defining the way the information is organized, distributed and referenced. LDAP defines the transport and format of messages used by a client to access data in a directory. LDAP uses the TCP/IP (Transmission Control Protocol/Internet Protocol) protocol stack. Naturally also other suitable ways to store and access deployment prototypes 214 and deployment data structures 216 can be used: the controller 200 can be configured to store deployment prototypes 214 and/or deployment data structures 216 in a repository, for example in a relational database.

At the commissioning phase a set of create-commands can be combined in a script file, which the controller 200 executes when the commissioning engineer makes a request through the user interface. The script file can be in a format called LDIF (LDAP Data Interchange Format). LDIF is a text file format. In this case the user interface uses the createNodesFromFile-method of the controller 200 to achieve the goal. The createNodesFromFile-method calls createNode-method for each create command in the file. The effect is the same as if the set of commands were given through the user interface.

Both LDAP and LDIF are standards defined by the Internet Engineering Task Force (IETF). If needed, one skilled in the art can consult their website (www.ietf.org) in order to find out more about the standards.

Figure 3:
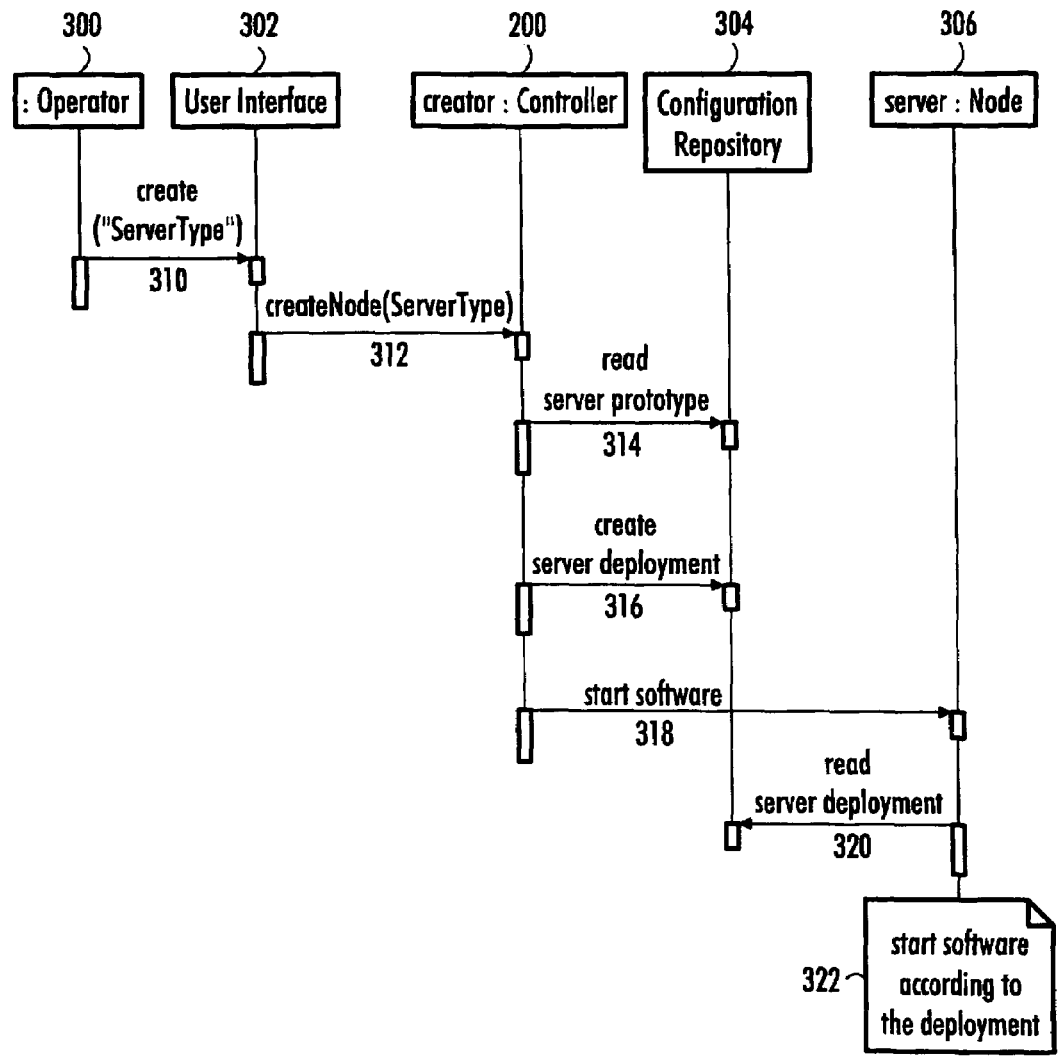
FIG. 3 is a signal-sequence chart illustrating the method for managing a configuration of clustered computers according to an embodiment of the invention.

FIG. 3 illustrates a method for managing a configuration of clustered computers. FIG. 3 presents an example of the creation and start-up of a node 306.

The configuration information has already earlier been defined as deployment prototypes for functional entities of clustered computers. Then, the predefined deployment prototypes needed for a configuration of clustered computers, are identified. In our example, the operator 300 requests 310 the creation of the node of type "Server" through the user interface 302.

The user interface 302 validates the operator request 310. If the result of the validation process is positive, the user interface 302 requests 312 the controller 200 to create a node of the type "Server", i.e. to clone the identified deployment prototypes for creating deployment data structures for clustered computers. The controller 200 reads 314 the related deployment prototype i.e. the definition of the Server node type from the configuration repository 304, for example from the LDAP directory. The controller 200 clones the deployment prototype and then stores 316 the result of the cloning operation, i.e. the deployment data structure in the configuration repository 304.

At this point, the deployment part of the scenario is completed. Then, the configuration of the clustered computers is managed according to the created deployment data structures. In this example, the controller 200 now requests 318 the previously created node 306 to start itself. The node 306 reads 320 the deployment data structure from the configuration repository 304. The node 306 finds the right deployment data structure based on its geographical address or any other appropriate identifier. Finally the node 306 starts 322 the software listed in the deployment data structure.

In the method, the prototype design pattern described above is applied in the creation of deployment data. Deployment data structures are described as deployment prototypes. These deployment prototypes are applied whenever an actual deployment data structure is created. There may be deployment prototypes for nodes, service units and processes, for example. According to one example, a scenario may be considered where the operator adds one or more new nodes in the network element in order to increase the capacity. The operator first identifies the correct node prototype. The node prototype defines what information the deployment data structure of the node should contain: the set of service units running in the node and for each service unit the set of processes, for example. When the operator gives a command to create the deployment data structure for the node, the system reads the given deployment prototype and clones the prototype to create the consequent deployment data structure. There are no hardwired rules in the software, which would be responsible for the creation of the deployment data. The operator does not have to know the details of the deployment data structure either. The operator just identifies the correct predefined deployment prototype and the system takes care of the rest. The operator may repeat the scenario as many times as needed. This makes the total amount of work considerably less when compared with a situation where the operator creates the deployment data node-by-node and object-by-object.

Figure 4:
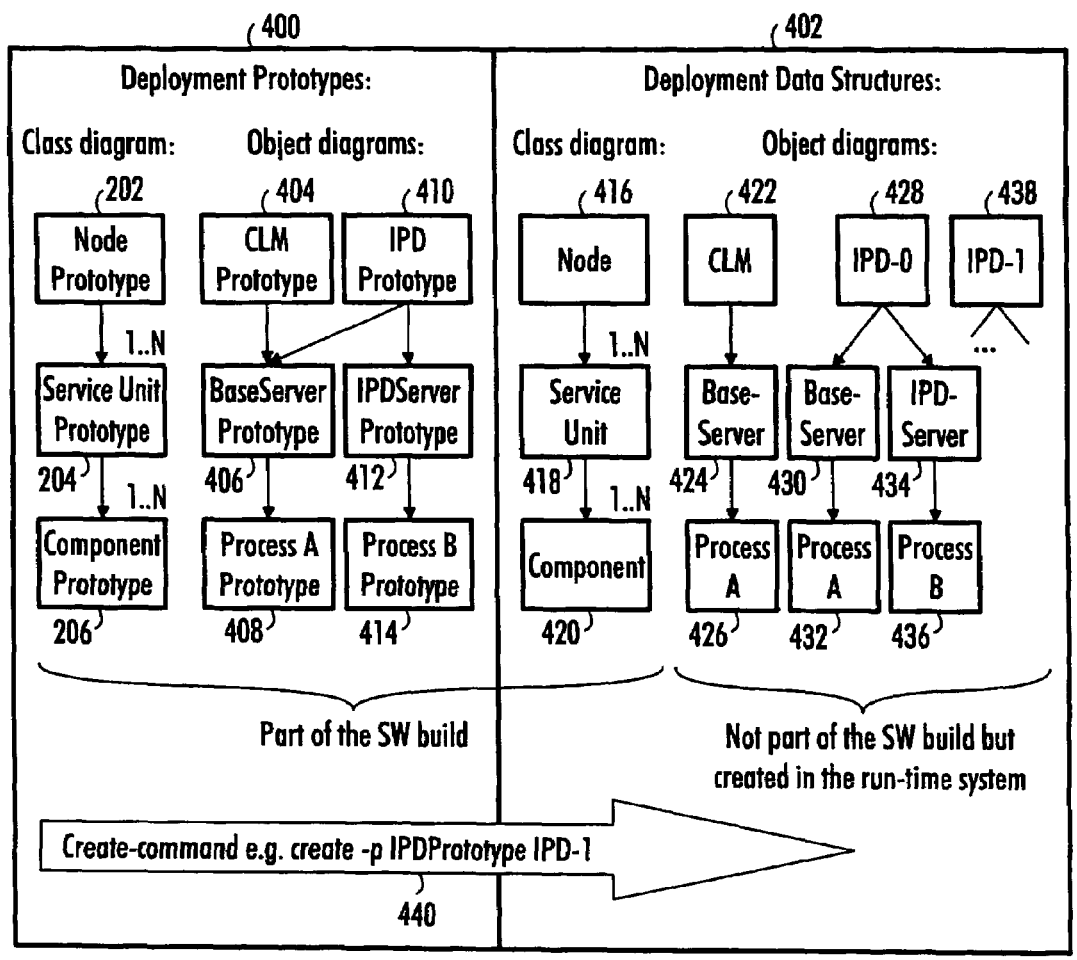
FIG. 4 illustrates deployment prototypes and deployment data structures according to an embodiment of the invention.

FIG. 4 illustrates still another example of deployment prototypes and deployment data structures. Both deployment prototypes 400 and deployment data structures 402 are stored in an LDAP-directory component. In this way the information is accessible for both external and internal actors through a standardized protocol and application programming interface (API). A user-interface component communicates with the operator. The controller component changes the contents of the LDAP-directory according to commands that the operator gives through the user interface. It is clear that other kinds of implementation alternatives exist: in place of the LDAP-directory component there could be other kinds of repository components, as mentioned earlier, for example. FIG. 4 presents both creational deployment prototypes 400 and deployment data structures 402. FIG. 4 also shows the related LDAP schemas. In this example the deployment prototypes 400 include as class diagrams, for example as an LDAP schema, a node prototype 202, a service unit prototype 204 and a component prototype 206. Deployment prototypes 400 also include as object diagrams, for example as LDAP contents, a CLM prototype 404, a BaseServer prototype 406, a Process A prototype 408, an IPD prototype 410, an IPD-Server prototype 412, and a Process B prototype 414. The existing deployment data structures 402 include as class diagrams, for example as an LDAP schema, a node 416, a service unit 418, and a component 420. The existing deployment data structures 402 also include as object diagrams, for example as LDAP contents, a CLM 422, a Base Server 424, a Process A 426, an IPD-0 428, a BaseServer 430, a Process A 432, an IPDServer 434, and a Process B.

According to this example, the situation is as follows: the class diagrams 202, 204, 206 of the deployment prototypes 400 and the class diagrams 416, 418, 420 of the deployment data structures 402 are part of the software build as LDAP schemas, and the object diagrams 404, 406, 408, 410, 412, 414 of the deployment prototypes 400 are part of the software build as LDAP contents, for example as LDIFs. The object diagrams 422, 424, 426, 428, 430, 432, 434, 436 of the deployment data structures 402 are not part of the software build; they are created for the run-time system as part of the configuration management. In this example, the terminology used corresponds to some extent with that used in object-oriented designing and programming: the class diagrams define the classes, and the object diagrams define the actual instances of the classes.

Finally, FIG. 4 illustrates what happens when the operator gives a create command 440: the deployment prototype is cloned to create actual deployment data. Thus deployment data structure 438 is created from the deployment data prototype 410. The structure of the deployment data structure 438 will thus look similar to that of the existing deployment data structure 428.

Even though the invention is described above with reference to an example according to the accompanying drawings, it is clear that the invention is not restricted thereto but it can be modified in several ways within the scope of the appended claims.

The invention claimed is:

1. A method, comprising:
defining configuration information comprising deployment prototypes for functional entities of clustered computers;
identifying predefined deployment prototypes needed for a configuration of the clustered computers;
cloning the identified deployment prototypes for creating deployment data structures for the clustered computers;
managing the configuration of the clustered computers according to the created deployment data structures;
storing and accessing at least one of the deployment prototypes and the deployment data structures according to a lightweight directory access protocol; and
commissioning the clustered computers,
wherein the defining comprising defining the configuration information as the deployment prototypes for the functional entities of the clustered computers belonging to a radio telecommunications system.

2. The method of claim 1, wherein the identifying comprises:
identifying the predefined deployment prototypes needed for the configuration of the clustered computers, the predefined deployment prototypes comprising a software configuration of the clustered computers.

3. The method of claim 1, wherein the defining comprises:
defining the configuration information comprising the deployment prototypes for the functional entities comprising a node, a service group, a service unit, a service instance, a component, a software resource, a hardware resource, a management unit, and a process.

4. The method of claim 1, further comprising:
storing at least one of the deployment prototypes and the deployment data structures in a repository.

5. The method of claim 1, further comprising:
increasing a capacity of the clustered computers.

6. The method of claim 1, further comprising:
increasing a functionality of the clustered computers.

7. The method of claim 1, further comprising:
reconfiguring an existing configuration of the clustered computers.

8. The method of claim 1, wherein the defining comprises:
defining the configuration information comprising the deployment prototypes for the functional entities of the clustered computers belonging to a computer network.

9. The method of claim 1, wherein the defining comprises:
defining the configuration information comprising the deployment prototypes for the functional entities of the clustered computers belonging to a telecommunications system.

10. A computer readable storage medium encoded with instructions that, when executed by a computer perform a process comprising:
  defining configuration information comprising deployment prototypes for functional entities of clustered computers;
  identifying the predefined deployment prototypes needed for a configuration of the clustered computers;
  cloning the identified deployment prototypes for creating deployment data structures for the clustered computers;
  managing the configuration of the clustered computers according to the created deployment data structures;
  storing and accessing at least one of the deployment prototypes and the deployment data structures according to a lightweight directory access protocol; and
  commissioning the clustered computers,
  wherein the defining further comprises defining the configuration information as the deployment prototypes for the functional entities of the configuration of the clustered computers belonging to a radio telecommunications system.

11. The computer readable storage medium claim 10, wherein the instructions, when executed by the computer, further perform:
  defining the configuration information comprising the deployment prototypes for the functional entities of the configuration of the clustered computers, the configuration information comprising a software configuration of the clustered computers.

12. The computer readable storage medium of claim 10, wherein the instructions, when executed by the computer, further perform:
  defining the configuration information comprising the deployment prototypes for the functional entities comprising a node, a service group, a service unit, a service instance, a component, a software resource, a hardware resource, a management unit, and a process.

13. The computer readable storage medium of claim 10, wherein the instructions, when executed by the computer, further perform:
  storing at least one of the deployment prototypes and the deployment data structures in a repository.

14. The computer readable storage medium of claim 10, wherein the instructions, when executed by the computer, further perform:
  increasing a capacity of the clustered computers.

15. The computer readable storage medium of claim 10, wherein the instructions, when executed by the computer, further perform:
  increasing a functionality of the clustered computers.

16. The computer readable storage medium of claim 10, wherein the instructions, when executed by the computer, further perform:
  reconfiguring an existing configuration of the clustered computers.

17. The computer readable storage medium of claim 10, wherein the instructions, when executed by the computer, further perform:
  defining the configuration information comprising the deployment prototypes for the functional entities of the configuration of the clustered computers belonging to a computer network.

18. The computer readable storage medium of claim 10, wherein the instructions, when executed by the computer, further perform:
  defining the configuration information comprising the deployment prototypes for the functional entities of the configuration of the clustered computers belonging to a telecommunications system.

19. A computer readable storage medium encoded with instructions that, when executed by a computer perform a process, the computer readable storage medium comprising:
  definition means for defining configuration information comprising deployment prototypes for functional entities of clustered computers;
  identification means for identifying the predefined deployment prototypes needed for a configuration of the clustered computers;
  clone means for cloning the identified deployment prototypes for creating deployment data structures for the clustered computers;
  management means for managing the configuration of the clustered computers according to the created deployment data structures;
  processing means for storing and accessing at least one of the deployment prototypes and the deployment data structures according to a lightweight directory access protocol; and
  commissioning means for commissioning the clustered computers,
  wherein the definition means is further for defining the configuration information comprising the deployment prototypes for the functional entities of the clustered computers belonging to a radio telecommunications system.

20. The computer readable storage medium of claim 19, wherein the identification means comprises a software configuration of the clustered computers.

21. A controller embodied on a computer readable storage medium readable by a computer, the controller comprising a computer program of instructions for executing a computer process for managing a configuration of clustered computers, the computer process comprising:
  defining configuration information as deployment prototypes for functional entities of the clustered computers;
  identifying the predefined deployment prototypes needed for a configuration of the clustered computers;
  cloning the identified deployment prototypes for creating deployment data structures for the clustered computers;
  managing the configuration of the clustered computers according to the created deployment data structures;
  storing and accessing at least one of the deployment prototypes and the deployment data structures according to a lightweight directory access protocol; and
  commissioning the clustered computers,
  wherein the defining comprising defining the configuration information as the deployment prototypes for the functional entities of the clustered computers belonging to a radio telecommunications system.

22. The controller of claim 21, wherein identifying the predefined deployment prototypes needed for the configuration of the clustered computers further comprises the predefined deployment prototypes comprising a software configuration of the clustered computers.

23. The controller of claim 21, wherein the computer-readable storage medium comprises a computer readable memory.

24. An apparatus, comprising:
  a processor configured to
    define configuration information comprising deployment prototypes for functional entities of clustered computers;
    identify the predefined deployment prototypes needed for a configuration of the clustered computers;

clone the identified deployment prototypes for creating deployment data structures for the clustered computers;

manage the configuration of the clustered computers according to the created deployment data structures, wherein the processor is further configured to define the configuration information comprising the deployment prototypes for the functional entities of the clustered computers belonging to a radio telecommunications system, wherein the processor is further configured to store and to access at least one of the deployment prototypes and the deployment data structures according to a lightweight directory access protocol, and wherein the processor is further configured to commission the clustered computers.

25. The apparatus of claim 24, wherein the processor is further configured to define the configuration information comprising a software configuration of the clustered computers.

26. The apparatus of claim 24, wherein the processor is further configured to define the configuration information comprising the deployment prototypes for the functional entities comprising a node, a service group, a service unit, a service instance, a component, a software resource, a hardware resource, a management unit, and a process.

27. The apparatus of claim 24, wherein the processor is further configured to store at least one of the deployment prototypes and the deployment data structures in a repository.

28. The apparatus of claim 24, wherein the processor is further configured to increase a capacity of the clustered computers.

29. The apparatus of claim 24, wherein the processor is further configured to increase a functionality of the clustered computers.

30. The apparatus of claim 24, wherein the processor is further configured to reconfigure an existing configuration of the clustered computers.

31. The apparatus of claim 24, wherein the processor is further configured to define the configuration information comprising the deployment prototypes for the functional entities of the configuration of the clustered computers belonging to a computer network.

32. The apparatus of claim 24, wherein the processor is further configured to define the configuration information comprising the deployment prototypes for the functional entities of the configuration of the clustered computers belonging to a telecommunications system.

* * * * *